Nov. 13, 1923.                                1,473,677
R. A. HOFFMANN
TURNBUCKLE LOCK
Filed Aug. 14, 1920          2 Sheets-Sheet 1
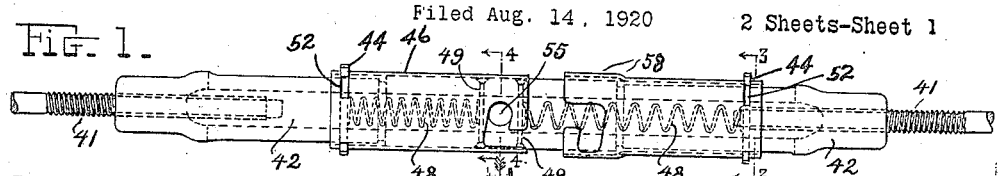
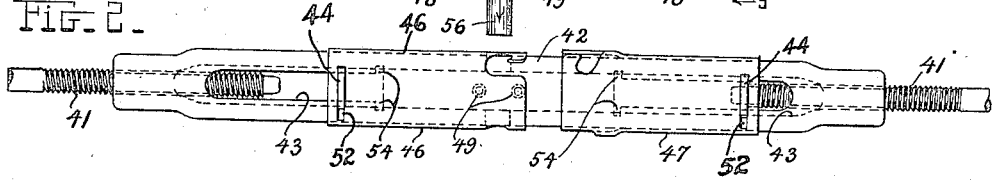
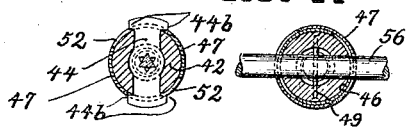 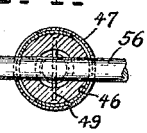 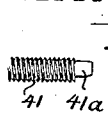  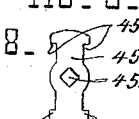 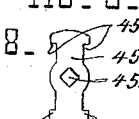
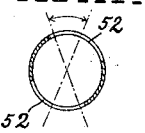 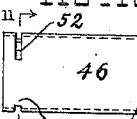 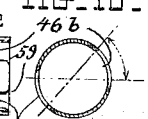  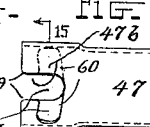 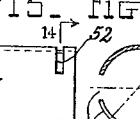
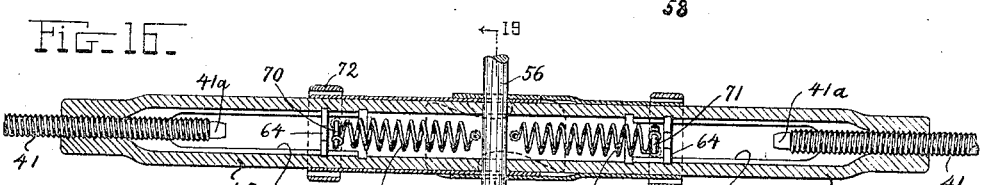
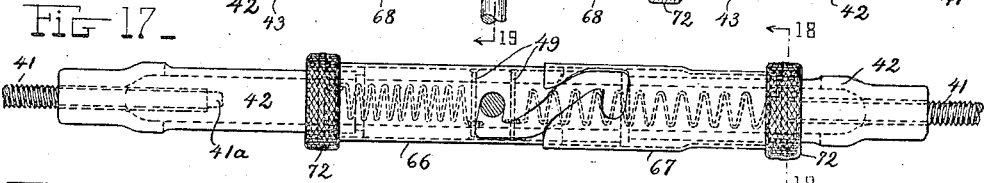
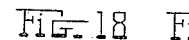 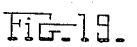 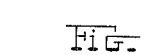 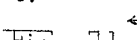 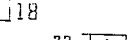
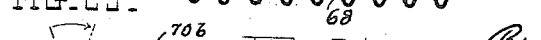
INVENTOR
Richard A. Hoffmann Nov. 13, 1923.  R. A. HOFFMANN  1,473,677
TURNBUCKLE LOCK
Filed Aug. 14, 1920  2 Sheets-Sheet 2
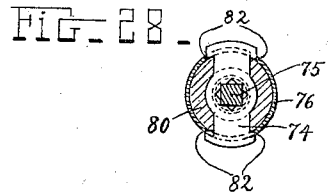
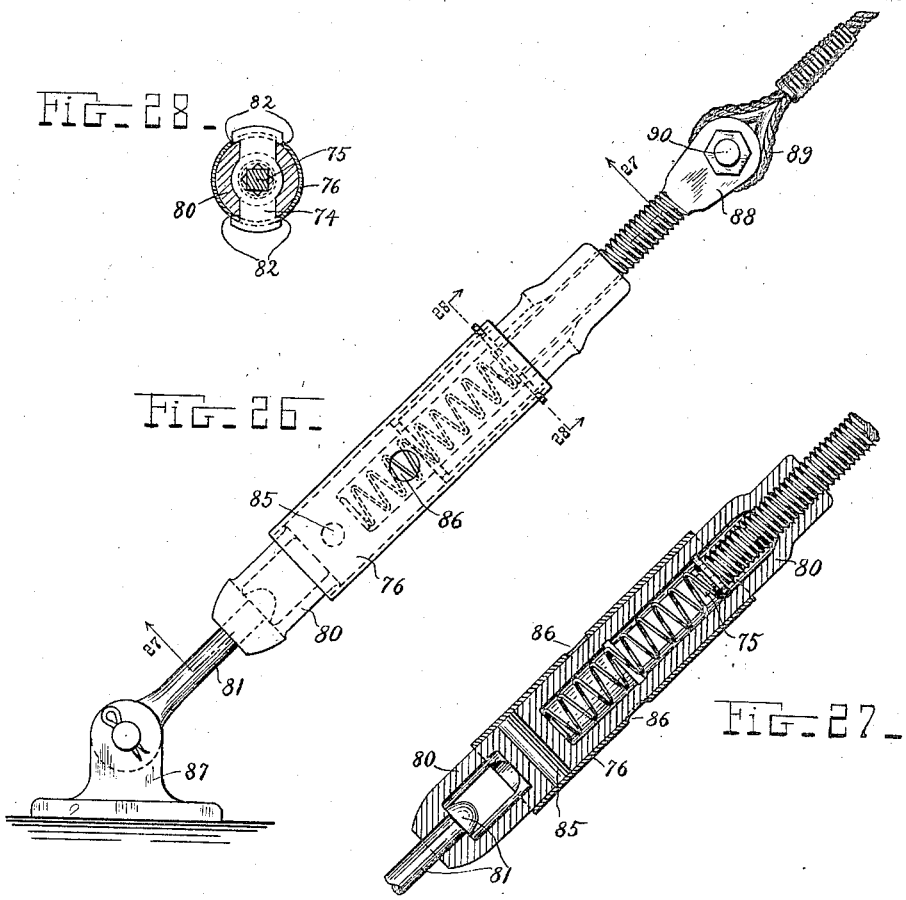
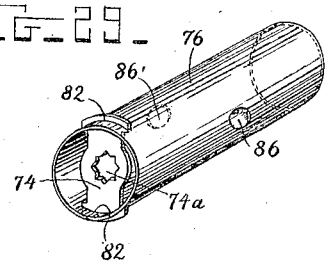
INVENTOR
Richard A. Hoffmann Patented Nov. 13, 1923.                                    1,473,677

UNITED STATES PATENT OFFICE.

RICHARD A. HOFFMANN, OF ROSEBANK, NEW YORK.

TURNBUCKLE LOCK.

Application filed August 14, 1920. Serial No. 403,583.

*To all whom it may concern:*

Be it known that I, RICHARD A. HOFFMANN, a citizen of the United States, and a resident of Rosebank, Staten Island, in the county of Richmond and State of New York, have invented certain Improvements in Turnbuckle Locks, of which the following is a specification.

This invention relates to improvements in turnbuckle locks and more specifically to such, wherein the locking against rotation of the two screw rods relatively to the connecting element or buckle is effected by a male and female combination, formed by either one or both of the screw rods with a member slidably engaged on the buckle.

Inasmuch as the "turnbuckle starlock" device for which application for Letters Patent was made Oct. 29, 1919 under Serial No. 334,257 by the inventor of the present device, belongs to this class of turnbuckle locks the invention can be represented as a modification of this system, as will be more fully explained hereafter, its application and scope however is not confined to the employ of the peculiar star-shaped female member which is the notable feature of this system, but will embrace the use of other suitable combinations as circumstances may permit.

Within the last decade turnbuckles have become an all important factor for the bracing and rigging of aeroplanes and dirigibles. The everchanging wind stresses and the constant vibrations of the motor which induce and facilitate a quick slackening of an unguarded turnbuckle in such cases make the demand for a reliable and handy locking device to prevent this dangerous loosening of the airplane rigging imperative.

The hitherto existing turnbuckle locks however seem to have proved inadequate in the case of aeroplane bracing.

Aside from such as are unreliable they were either not intended for, or adaptable to the diminutive sizes and peculiar requirements of these buckles, or were too complicated, and in particular a handy locking and unlocking of the device was not provided, which however is a most desirable adjunct considering the many readjustments which changes of temperature and weather conditions constantly necessitate.

Consequently, in lack of some specialized contrivances answering their purpose, aviators and builders of air vehicles, up to the present, were forced to safeguard the rigging against unscrewing of the turnbuckles in a purely manual way, that is, by wrapping a long wire around the buckle, which ordinarily is located near one end of the brace, tugging the ends of the wire through a hole provided for this purpose in the buckle, as well as through the shackle of the outer terminal of the threaded rod, and finally twisting them together so as to form a tight-drawn lace which will prevent a rotation of the buckle, at least for one complete revolution. Every time the buckle is readjusted this wire has to be untied or cut and the whole aforesaid manipulation repeated, which, considering the great number of turnbuckles on each machine, entails an undue amount of time and labor.

It is with special consideration of this deficiency, but not to the exclusion of other technical applications, that the present invention is contrived and reduced to practice.

One object of the invention therefore is to provide a reliable turnbuckle lock which is especially adapted to small sizes of turnbuckles, such as are employed in aeroplane bracing, without impairing the working strength of them or interfering with the smooth run of the thread.

Another object is to provide means for instantly locking or releasing the turnbuckle by a simple manipulation without the use of detachable parts or tools specially provided for locking purposes.

A third object is to provide a lock which will operate at practically any desired point of the adjustable length of the screw rods and so retain a maximum of tension.

A fourth object is to provide means whereby the turn-buckle lock is made "foolproof," that is: to make the locking process automatic and independent of the operator's special care or neglect.

A fifth object is to provide a design which is compact, void of protruding parts and renders the operative elements dust- and weatherproof.

Other objects are: simplicity, light weight, and low cost of manufacture without curtailing the strength and durability of the construction.

These various objects are attained by the novel mechanisms and combinations of parts described hereafter and shown in the accompanying drawings in which:

Figure 1 is an assembled side view of a turnbuckle with a locking mechanism at each end, designed in accordance with the invention but showing its more simplified application. The screw rod to the right is shown locked, the lock to the left is shown in the cocked position, leaving the corresponding screw end unlocked and free for adjustment.

Figure 2 is a bottom view of the same design.

Figure 3 is a sectional view on line 3—3 of Figure 1.

Figure 4 is a sectional view on line 4—4 of Figure 1, but as it would appear, if the adjusting rod indicated above the middle of Figure 2 were inserted into the center hole and both screw locks were opened.

Figure 5 shows the inner terminal of the threaded rod forming the "key" or male member which this class of locks requires.

Figure 6 is an end view of this key.

Figure 7 is a detail view of the female member or keyway-frame, both Figures 6 and 7 forming a combination, such as the "starlock" system requires.

Figure 8 and Figure 9 show another combination applicable to the invention.

Figure 10 is a side view of the barrel sleeve shown on the left of Figure 1.

Figure 11 is a sectional view on line 11—11 of Figure 10. The double arrow indicates the angle of rotation of the sleeve.

Figure 12 is a sectional view on line 12—12 of Figure 10.

Figure 13 is a side view of the barrel sleeve shown on the right of Figure 1.

Figure 14 is a sectional view on line 14—14 of Figure 13.

Figure 15 is a sectional view on line 15—15 of Figure 13.

Figure 16 shows in section an assembled view of another turnbuckle with a lock on each end, designed in accordance with the invention and exhibiting all the features and parts claimed for it. Both barrel sleeves are held by the adjusting rod in a cocked position, leaving the screw ends unlocked.

Figure 17 is an outside view of the same turnbuckle showing the barrel sleeve to the right in a locking position.

Figure 18 is a sectional view on line 18—18 of Figure 17.

Figure 19 is a sectional view on line 19—19 of Figure 16.

Figures 20 and 21 are detail views of the barrel sleeves shown on Figure 17.

Figure 22 is a sectional view on line 22—22 of Fig. 21 and

Figures 23, 24, and 25 illustrate the way in which the automatic engagement spring is attached in this case to the barrel sleeves and the supporting pins near the center hole.

Figure 26 shows the adaptation of the invention to a swivel-turnbuckle.

Figure 27 shows a sectional view on line 27—27 of Fig. 26.

Figure 28 shows a sectional view on line 28—28 of Fig. 26.

Figure 29 is a perspective view of the barrel sleeve.

As was indicated Figures 16 to 25 represent the invention in its most complete form. If however one chooses to waive one or the other of the less vital advantages which this construction affords,—as will be set forth hereafter,—it is possible to simplify the construction, reduce the cost of manufacture and still have a working device which completely fulfills all essential purposes and proposed objects of the invention. This is represented by the device shown in Figures 1 to 15, and for the sake of readier understanding this simplified arrangement will be first explained.

As the tension rods used for aeroplane bracing and kindred structures are mostly of very small sectional area and consequently the turnbuckle rods are provided with a fine thread, for instance 24 turns per inch for a 3/16″ screw, or even less, it is plain that any interruption of the helix by holes, grooves or the like, for the purpose of providing a grip for a locking device would weaken the tensional and torsional strength of the rods.

The transformation of the inner tensionless terminal of the rod in such a way that with a member, slidably engaged with the buckle, it forms a male and female combination which does not interfere with the action of the thread, is therefore a proper expedient for providing a locking means.

Whether the end of the rod represents the female part, for instance: by being grooved or slit, while the corresponding male part is formed by a key, a ledge, or a peg fitting into this groove and supported by the buckle, on which it can slide longitudinally,—or whether the rod represents the male part, by being formed with prismatic surfaces fitting into a corresponding opening in a frame, slidingly engaged with the buckle and serving as the female part (see Figures 8 and 9) is a matter of option and expediency.

For practical reasons however and to attain a maximum of adjustability a combination, which belongs to a class of turn-buckle locks named the "starlock system" and for which the undersigned has filed a separate application for Letters Patent, on Oct. 29, 1919, under Serial No. 334,257 is recommended.

An example of such combination is shown by Figures 5, 6, and 7. The rods 41, threaded right hand and left hand, as shown in Figure 1, and screwed into the buckle or barrel, 42, which is of the usual pattern, are formed on their inner extremities with a triangular prism 41ª (Figures 5 and 6), slightly tapered towards the end. The plate 44 (Figure 7) which slidably fits at right angles into the slot 43 of the buckle (Figure 2), has in the middle an opening 44ª in the shape of a six-pointed star. The triangular prism fits into this star-shaped aperture at every turn of 60 degrees, and if for instance the screw bolt has a standard pitch of 24 threads per inch, then the male and female combination would allow an adjustment at every 1/144" which is more than sufficient for all practical purposes.

Other combinations upon the same principle are also possible, for example that of a square key 75 (see Figures 28 and 29) fitting into an eight-pointed star-keyway 74ª which is the outline of a figure described by repeating the square form of the key at turns of 45 degrees each. This would allow adjustments of 1/192 inches. These different combinations are more extensively dealt with in the specification of the starlock-system referred to above.

When however such minute adjustment is not deemed necessary, it is entirely practical and sufficient to use simpler arrangements for the male and female members, as for instance a square key, 41ᵇ, fitting into a square keyway 45ª (Figures 8 and 9) which still allows adjustments at every 1/96" with a thread of 24 turns per inch.

To give the plate 44 or 45 still more guidance along the slots 43, where the plate projects beyond the slot, small ledges, 44ᵇ and 45ᵇ respectively, are provided (see also Figure 3).

To prevent the members containing the sliding part of the male and female combination from tilting sideways a further guide is required which in this case is furnished by sleeves 46 and 47, slidably engaged with the buckle and suitably connected with the members mentioned above.

As outlined by the second object, some means must be provided to maintain the combination in its place when the key enters the keyway, also, when the movable member, in this case the keyway plate, is disengaged, the plate has to be temporarily arrested at an out of the way point to run clear of the key.

As the statement of the second object implies, this has to be accomplished by a purely dynamic arrangement without the use of detachable members or tools.

The first part, the maintenance of the combination, is accomplished by the action of a compressive coil spring 48 which when released, presses the keyway plate against and over the key. This spring rests on a pin 49, pivoted or screwed into the buckle with its ends countersunk or flush with the periphery.

The coil spring presses either directly against the locking plate 44 (or 45) in such way that it does not interfere with the key entering through the keyway, or it may be fastened to the sleeve whereby it indirectly pushes the plate forwards.

The last turn of the coil on either end is preferably closed in the usual way to provide a better bearing (not shown on the first drawing, but indicated in Figures 26 and 27).

The second part, the unlocking and arresting of the plate during adjustment of the screw rods has consequently to be done by the manual compression of the spring and then by temporarily interlocking the resilient movement of the same by some kinetic device. The latter is accomplished by forming the sleeves 46 and 47 at their inner ends with one or more bayonet joints, that is, kneelike incisions, as shown by 46ª, 46ᵇ, and 47ª, 47ᵇ which are adapted to catch on some protruding part of the barrel 42.

As the function of these bayonet joints however calls for a limited movement around the axis of the sleeves, the connection between these and the locking plate of the male and female combination must provide for this limited freedom of movement. This is done preferably, by passing the keyway plates through narrow slits 52 cut diametrically through the outer ends of the sleeves 46 and 47, and of such length that they permit as much rotation of the sleeves as the function of the bayonet joints calls for (see Figures 3, 10, 13 and 14).

It is understood however that this connection between sleeves and keyway plates may be modified in many ways, provided that it forms a joint, allowing a limited movement of the bayonet cutouts in relation to the barrel 42 or to an element in connection therewith which is to furnish a catch for these cutouts.

In order to facilitate the insertion of the keyway plates through the slits 52 into the interior of the barrel 42 the inner ends of the slots 43 are widened out by a cross-slot 54 going clear through the barrel and being wide enough to pass the plates through. If in assembling the coils are compressed within the space between this cross-slot and the pin 49, while the slot 52 of the sleeve is brought just over the cross-slot, the plate may be easily inserted. Pushed forward by the spring into the narrower part of the slot it is held securely against slipping out (see Figure 3).

As for the stationary part of the buckle which is to offer a catch to fasten the bayonet joints to, it is obvious that any peg or screwhead protruding from the periphery of the barrel in an appropriate place would serve the principal purpose.

As however these turnbuckles as a rule are provided with a circular hole in the center through which a round bar or rod 56 is temporarily pushed to serve as a lever when turning the buckle for adjustment, this rod can be utilized instead of a permanent peg or screwhead with great advantage.

First it makes the device "foolproof". As the rod furnishes the only catch for the bayonet joints and is always withdrawn after adjustment, the turnbuckle can never stay unlocked through any carelessness of the operator.

Secondly, while otherwise after adjusting, the locking mechanism, being in a "cocked" position, would have to be released to become operative, this manipulation will now be spared and the turnbuckle will automatically spring into a locking position as soon as the bar is withdrawn.

Third, the sleeves being made long enough to reach over the center of the buckle when they catch on the bar 56, they cover the slots 43 and thereby protect the compression spring against dust and the oxidizing influence of the atmospheric moisture.

Fourth, while hitherto the steel rod used for tightening or slackening the buckle had a tendency to slip out of its socket through inadvertence of the operator, when changing hands in turning, and was liable to drop out of sight, the resilient grip of the sleeves on the rod will prevent this annoying incident.

As both sleeves with their respective bayonet joints must lock over the rod, one of them must telescope over the other. To accomplish this its inner tube end is expanded for the necessary length, as shown at 58.

It is also to be observed that if double bayonet joints in each sleeve are used they have to be located opposite to each other, that their inlets should have no sharp corners (see 59), and the angle of their bends or knees 60 should recline somewhat towards the near end of the sleeves to facilitate the entrance of the bar and prevent its accidental slipping out again.

The operation of the device is as follows:

After inserting the steel bar into the center hole of the buckle the sleeves are pushed towards the center, being turned at the same time so as to slide the end slots of the bayonet joints over the steel bar. Then the bayonet joints are hooked over the bar, by turning the sleeves in a clockwise direction, when looking towards the center. This manipulation first unlocks the screw bolts and then allows the turnbuckle to be adjusted.

After adjustment the bar is pulled out whereupon the coil springs will throw both keyway plates with their sleeves into a locking position, uncovering the center hole.

The keys meanwhile may or may not have entered the keyway frames. If not, the plates will simply press against the ends of the keys. By inserting the bar again into the center hole, if even for a short distance and striking the bar a gentle tap, a click may be heard and the plates will be observed to slide over the keys. If one tap is not sufficient to close both ends a second tap will complete the locking.

But even without this final precaution the turnbuckle is safeguarded against unscrewing, for as soon as the thread begins to slacken spontaneously or through the slightest concussion, the key will enter the keyway plate as soon as it turns into the next locking position. The loss thus sustained in tension is negligible and will at the most be less than the minimum variation in adjustable length.

As will appear from the foregoing description all the various objects of the invention are considered and provided for by this device, the modification hereafter described however, while it does not deviate from the main points of the construction and introduces no new object, renders—with a slight increase of the manufacturing cost— the manipulation of unlocking the buckle previous to adjustment still more convenient and automatic.

This additional feature of the invention will become apparent from considering the design illustrated by Figures 16 to 25. Parts of identical construction are indicated by the same numerals as in Figures 1 to 15.

Instead of letting the compression coils 68, bear by contact only against the pins 49 and the locking plates 64, they are connected by little loops $68^a$ and $68^b$ directly, or indirectly to these parts. The rings of these loops are located on the periphery of the coil and are within the cylindrical path of its helix (see Figures 24 and 25).

The inner loops $68^a$ maintain a grip on the pins 49 which are stationary in the barrel 42, while the outer loops $68^b$ are fastened to special traverses 70 and 71, diametrically pivoted across the sleeves 66 and 67 in such manner that they run parallel with the inner surface of the locking plates 64,—leaving sufficient clearance for the key $41^a$,—and can oscillate around the axis of the sleeve within the slots 43 and over such a sector as the function of the bayonet joints $66^a$, $66^b$ and $67^a$, $67^b$ requires (indicated by arrows in Figures 22 and 25).

Before these loops $68^b$ are fastened on the traverses however, the coils are given an initial circumferential twist, so that by their tension they will press the traverses 70 and 71 towards the diametrically opposite edges 43$^a$ and 43$^b$ of the barrel slot 43, as far as the length of the sleeve slits 52 will permit. See Figure 18. If the traverse were now swung the other way toward the diametrically opposite edges 43$^c$ and 43$^d$, it is evident that this would increase the torsion of the coil and that the traverse when released again would snap back into its first position.

As it would be difficult to rivet a solid thin pin with a proportionally long and unsupported shank without buckling the same, the traverses 70 and 71, instead of being solid, are formed of thin tubing, flanged on one end, 70$^a$ and 71$^a$, and after assembling flattened out at the other end 70$^b$ and 71$^b$, similar to the well known little eyelets for paper washers on envelopes.

The spindle of the swaging tool, when inserted through the tubing, during the act of flattening out the ends 70$^b$ and 71$^b$ keeps the tube from buckling.

The bayonet joints 66$^a$, 66$^b$ and 67$^a$, 67$^b$ are also modified somewhat. Their inlets are cut at an angle to the axes of the sleeves so that, when their oblique edges 66$^c$, 66$^d$ and 67$^c$, 67$^d$ strike the rod 56, they will operate like cams and make the sleeves rotate in opposite directions, till the rod 56 has passed the noses 66$^e$ and 67$^e$ of the bayonet joints. Then the torsion of the coils which was increased by the cam-movement of the sleeves makes the sleeves snap back into their initial position relative to the periphery of the buckle and thus completes their grip on the steel rod 56.

As this automatic operation must not be interfered with by the operator's fingers a special rest is provided for them by two supports 72, connected rigidly to the locking plates 64, but not interfering with the free movement of the sleeves which are jointed to the locking plates as explained before.

These supports admit of different construction, a preferred arrangement being shown by making them two elastic cylindrical rings 72 sprung over two short stubs 73 fitting into the slots 73$^a$ and flush with the cylindrical surface of the rings when inserted. The inside diameter of these cylindrical rings is a little wider than the outside of the sleeves, and the outer surface of the rings can be knurled to provide a better hold for the fingers and to make their destination as finger-rests more obvious. It is to be understood however that the provision of these supports is not indispensable and that they are added only for the sake of convenience, as instead of them the protruding tops of the locking plates (as shown in Figure 3) might be used as a hold when manipulating the device.

The process of unlocking, adjusting and locking the turnbuckle is the same as described before, with this difference only that the fingers of the operator in unlocking the turnbuckle are placed on the knurled rings and the sleeves are pushed towards and over the adjusting rod without any rotary motion of the hands, this motion being supplied by the mechanism as described.

Both turnbuckles as illustrated are provided with a locking device on both ends. This however would only be necessary, if the screwed rods 41 can rotate in relation to each other. In cases where these terminals can change their relative position only longitudinally, for instance by using rigid outer attachments allowing no rotation of the rods themselves or none of any consequence, it is obvious that one end of the turnbuckle only needs a locking device.

The same is the case with a turnbuckle with a swivel end, as shown in Figure 26. This turnbuckle has only one threaded bolt to adjust the tension, and the other end is provided with a swivel bolt 81.

The buckle 80, for example, may be made of malleable cast iron with the swivel bolt separately manufactured and imbedded in the mold. The casting which first shrinks so tightly upon the swivel that it cannot be turned, will upon annealing expand and loosen enough to allow a ready turning. The buckle and swivel can also be made of other material, for instance phosphor-bronze, by well known processes of manufacture or may vary in shape to suit conditions.

This sort of turnbuckle has the advantage that any torsional moment which may develop in the twisted strands or the wire rope to which the turnbuckle is attached is taken up by the swivel joint which will yield to it without slackening the longitudinal stress of the buckle and thereby relieve the pressure on the locking members 74 and 75. Consequently the key and keyway combination can be made, as shown, of finer adjustment without danger of having the key or the zigzag projections of the starlock hole wrenched off by torsion.

It remains to be described what modifications, if any, the application of the invention may call for, when only one end of the buckle has to be locked.

Though of course the locking mechanism as shown in Fig. 17 could be employed without change and would have the desired effect, it is apparent that no expansion of the sleeve end is needed. The incisions 66$^a$ and 66$^b$ may also now be reduced to circular holes 86, preferably of a little larger diameter than the center hole 85, as the adjusting rod can be inserted after the sleeve is pushed back till the holes 85 and 86 correspond. Consequently no turning of the sleeve is required and the slits 82 can fit closely around the locking plate 74 (see Figures 28 and 29).

By making the sleeve long enough to cover the barrel hole 85 when the buckle is locked, the device can be made doubly foolproof, that is: besides safeguarding against being left unlocked, the buckle, when locked, is also safeguarded against anybody inserting the steelrod into the center hole and starting to adjust the buckle without first unlocking it,—risking thereby to wrench off the starlock members by force.

This modification, namely: the reduction of the bayonet joint to a mere hole, the consequent rigid connection of the sleeve with the locking plate, and the elongation of the sleeve to guard the center hole could, if so desired, also be applied to one end of a turnbuckle with double locks, the other end however could not dispense with the bayonet joint, as the pushing together of two resilient sleeves with subsequent insertion of the adjusting bar through the superimposed sleeve holes and the barrel hole would prove a very awkward manipulation.

In summary it will be found most practical to confine this simplification to turnbuckles with one lock only, as illustrated.

In all other details this last device can be the same as the one shown in Figures 1 to 15. The swivel bolt 81 is shown hinged in the forked bracket 87, as may be inferred from Fig. 26, while the threaded bolt is formed with a fork 88, embracing a rope shackle 89 and hinged to it by means of a bolt 90. These latter details however may greatly vary, as circumstances require.

Having thus described the invention in some of its possible forms, what I claim as new and desire to protect by Letters Patent, is:

1. The combination with a turnbuckle, consisting of a threaded stem, a connecting element into which said stem is screwed, and a turnbuckle lock, comprising a male and a female member attached to the stem and the connecting element respectively, and a coil spring seated on said element, adapted to engage by its resilience the male with the female member and to lock the components of said turnbuckle by such engagement; of means to secure said spring in a cocked position while the male and female members are disengaged.

2. The combination with a turnbuckle, consisting of a threaded stem and a connecting element into which said stem is screwed; of a frame slidably supported by this element and perforated by a polygonal aperture, a prismatic key protruding from and integral with the inner end of the threaded stem, adapted to fit into the frame perforation at a multiplicity of angles, a compressive spring seated on the aforesaid connecting element and effecting the engagement of the frame with the key through its expansion when released and of means to secure said spring in a cocked position when compressed.

3. The combination with a turnbuckle, consisting of a threaded stem and a connecting element into which said stem is screwed; of a frame slidably supported by this element and provided with a star-shaped opening concentric with the axis of the threaded stem, a key formed on the inner end of the threaded stem and having such sectional area that it can engage with the star-shaped opening at different angles, a compressive spring seated on the aforesaid connecting element and effecting the engagement of the frame with the key through its expansion when released and of means to secure said spring in a cocked position when compressed.

4. The combination with a turnbuckle device, consisting of a threaded stem, an internally threaded link cooperating with it, said link being adapted to temporarily attach an adjusting tool thereto, and of a turnbuckle lock, comprising a male and female member attached to the stem and the link respectively, and a spring, so arranged that when released it will engage the male with the female member and lock thereby the component threaded parts of the turnbuckle against rotation; of means to secure said spring in a cocked position by the temporarily attached adjusting tool while said male and female members are in disengagement.

5. The combination with a turnbuckle device, consisting of a threaded stem, an internally threaded link cooperating with it, said link being adapted to temporarily attach an adjusting tool thereto, and of a turnbuckle lock, comprising a frame slidably supported by the threaded link and perforated by a polygonal aperture, a prismatic key protuding from and integral with the inner end of the threaded stem, adapted to fit into the frame perforation at a multiplicity of angles, and a spring so arranged that when released it will engage the male with the female member and lock thereby the component threaded parts of the turnbuckle against rotation; of means to secure said spring in a cocked position by the temporarily attached adjusting tool while said male and female members are in disengagement.

6. The combination with a turnbuckle device, consisting of a threaded stem, an internally threaded link cooperating with it, said link being adapted to temporarily attach an adjusting tool thereto, and of a turnbuckle lock, comprising a frame, slidably supported by the link and provided with a star-shaped opening concentric with the axis of the threaded stem, a key protruding from and integral with the inner end of the stem, having such sectional area that it can engage with the star-shaped opening at different angles, and a spring so arranged that when released it will engage the star-shaped opening with the key and lock thereby the component threaded parts of the turnbuckle against rotation; of means to secure said spring in a cocked position by the temporarily attached adjusting tool while said star-shaped opening and key are in disengagement.

7. The combination with a turnbuckle, comprising a threaded stem and an internally threaded link, cooperating with it and being provided with a longitudinal slot; of a turnbuckle lock, comprising a frame, a spring and a frame-guide, the frame being slidably engaged in the above said slot and adapted to form a male and female locking combination with the inner end of the threaded stem, this end having a particular cross section adapting it for said purpose, the spring being seated on the link and so arranged that when released it will tend to close the male and female locking combination, the frame-guide being slidably mounted on the above said link and so attached to the frame that it maintains the position of the frame in a plane perpendicular to the axis during its travel along the longitudinal slot, and of means to detain said frame-guide in a cocked position when the turnbuckle lock is disengaged from the threaded stem.

8. The combination with a turnbuckle, comprising a threaded stem and an internally threaded link, cooperating with it, said link being adapted to temporarily attach an adjusting rod thereto; of a turnbuckle lock, comprising a frame, a key, a spring and a sleeve, the frame being slidably mounted in the turnbuckle link rectangular to the axis of the threaded stem, and having a perforation concentric with this axis and serving as a keyway, the key protuding from and integral with the engaging end of the threaded stem, and having such cross section that it can engage with the frame perforation, the spring being seated on the link and so arranged that, when released, it will effect the engagement of the key with the keyway, locking the turnbuckle thereby against rotation, and the sleeve being slidably mounted on the turnbuckle link and so attached to the frame that it maintains the position of the frame in a plane rectangular to the turnbuckle axis during its travel along the link, and of means to detain said sleeve which controls the movements of the frame and the spring acting on the frame, in a cocked position by the temporarily attached adjusting rod, when the turnbuckle lock is disengaged.

9. The combination with a turnbuckle, comprising a threaded stem and an internally threaded link, cooperating with it, said link being adapted to temporarily attach an adjusting rod thereto; of a turnbuckle lock, comprising a frame, a key, a spring and a sleeve, the frame being slidably mounted in the turnbuckle link rectangular to the axis of the threaded stem, and having a perforation concentric with the axis and serving as a keyway, the key protruding from and integral with the engaging end of the threaded stem, and having such cross section that it can engage with the frame perforation, the spring being seated on the link and so arranged that, when released, it will effect the engagement of the key with the keyway, locking the turnbuckle thereby against rotation, and the sleeve being slidably mounted on the turnbuckle link and attached to the frame in such way that it maintains the position of the frame in a plane rectangular to the turnbuckle axis during its travel along the link, but allows an independent limited movement of the sleeve in a circumferential direction, and provided at the inner end with an incision, adapted to engage with the temporarily attached adjusting rod, when the turnbuckle lock is disengaged, thereby securing the lock in a cocked position.

10. The combination with a turnbuckle, comprising a threaded stem and an internally threaded link, cooperating with it, said link being adapted to temporarily insert an adjusting rod into it; of a turnbuckle lock, consisting of a frame, a key, a sleeve and a compression spring, the frame being slidably mounted in the turnbuckle link rectangular to the axis of the threaded stem, and having a perforation concentric with this axis and serving as a keyway, the key protruding from and integral with the engaging end of the threaded stem, and having such cross section that it can engage with the frame perforation, the sleeve being slidably mounted on the turnbuckle link, attached on the outer end to the frame in such way that it maintains the position of the frame in a plane rectangular to the turnbuckle axis during its travel along the link, but allows an independent limited movement of the sleeve in a circumferential direction, on the inner end provided with a particular cam-like cut-out adapted first to impart a limited rotating motion to the sleeve when brought into cooperation with the temporarily inserted adjusting rod, and then reversing this motion by the course of the inside terminal of the cutout, so as to hitch the sleeve onto the rod, and the spring being so arranged that, when released, it will effect the engagement of the keyway with the key, locking the turnbuckle against rotation, said spring being attached with one end to a stationary part of the link, with the other end to the sleeve, controlling the frame, in such manner that, when compressed it will coact with the motions of the sleeve, imparting to them resilient force, and effecting thereby a locking of the sleeve in a cocked position when the frame is disengaged from the stem.

11. The combination with a turnbuckle, consisting of a threaded stem, a connecting link, and a swivel bolt, the connecting link being internally threaded on one end to receive the threaded bolt, formed on the other end as a collar, receptive of the swivel bolt, and being diametrically perforated to temporarily insert an adjusting rod through it; of a turnbuckle lock, comprising a frame, a key, a spring and a sleeve, the frame being slidably mounted in the connecting link near the threaded end, rectangular to the axis of the threaded stem and having a perforation concentric with this axis and serving as a keyway, the key protruding from and integral with the engaging end of the threaded stem, and having such cross section that it can engage with the frame perforation, the spring being seated on a stationary part of the turnbuckle link and so arranged that, when released, it will effect the engagement of the keyway with the key, locking the turnbuckle against rotation and the sleeve being slidably mounted on the turnbuckle link, fixedly attached at the outer end to the frame, guiding the same at right angles to the turnbuckle axis, and provided near the inner end with a perforation adapted to register with the perforation in the connecting link when sliding over the same, so that the adjusting rod can pass through said registering perforations to secure said sleeve, which controls the frame and the spring acting on the frame, in a cocked position while the turnbuckle lock is disengaged.

In testimony whereof I have signed my name to this specification.

RICHARD A. HOFFMANN.